Figures 1, 2:
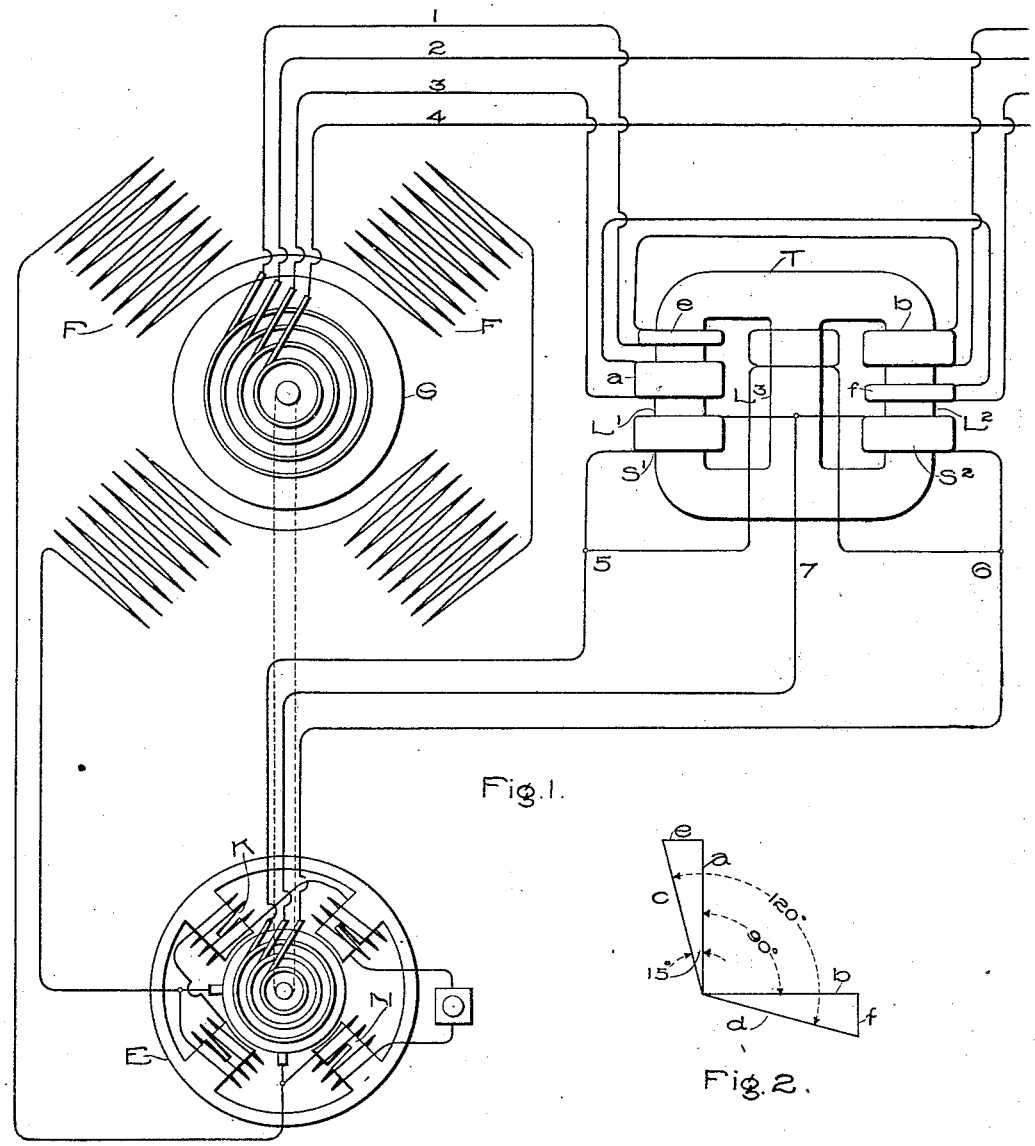

No. 717,464. Patented Dec. 30, 1902.
C. P. STEINMETZ.
SYSTEM OF ELECTRICAL DISTRIBUTION.
(Application filed Mar. 31, 1902.)

(No Model.)

WITNESSES:
Harry H. Tilden
Helen Orford

INVENTOR:
Charles P. Steinmetz.
by Albert G. Davis
Att'y.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

SPECIFICATION forming part of Letters Patent No. 717,464, dated December 30, 1902.

Original application filed August 19, 1899, Serial No. 727,734. Divided and this application filed March 31, 1902. Serial No. 100,669. (No model.)

*To all whom it may concern:*

Be it known that I, CHARLES P. STEINMETZ, a citizen of the United States, residing at Schenectady, county of Schenectady, State of New York, have invented certain new and useful Improvements in Systems of Electrical Distribution, (a division of my prior application, Serial No. 727,734, filed August 19, 1899,) of which the following is a specification.

The invention hereinafter described embodies a principle of operation disclosed in the patent to E. W. Rice, Jr., No. 595,412, dated December 14, 1897, for a means for regulating alternating-current dynamo-electric machines in which the field of a dynamo-electric machine is regulated by causing alternating current from its armature to pass through the armature of the exciter for said machine, thereby varying the field, and consequently the electromotive force, of the exciter both in accordance with the magnitude and the phase displacement of the alternating current. While my invention relates to an organization suitable for accomplishing this general result, it is not to be limited thereto, but is to be understood as separately covering certain devices and features of invention, which, although they form a part of the apparatus hereinafter described, are capable of useful application in a wide variety of ways.

To determine the scope of my invention therefor, reference is made to the claims in this application, in which its various features are intended to be clearly and particularly pointed out.

In its details my invention will be more readily understood by reference to the following description, taken in connection with the accompanying drawings, in which—

Figure 1 illustrates in diagram one embodiment of my invention, while Fig. 2 is an explanatory diagram of magnetomotive forces.

In cases where alternating-current machines of large capacity are to be compounded by passing alternating current through the armature of the exciter and in this way varying its field I find it generally undesirable to make use of the whole current for this purpose. I employ instead a fractional portion of this current, derived from the secondary or secondaries of transformers, the primaries of which are placed in series with the main lines leading to the machine to be regulated. By choosing a suitable ratio of transformation it is thus possible to supply the exciter with an alternating current which varies in proportion to the variation of current passing through the machine to be regulated and is at the same time of a value adapted to the capacity of the exciter. If the dynamo-electric machine to be regulated is of the two-phase type, the series transformers thus required would ordinarily be either of the single-phase or two-phase type to correspond. I have discovered that a considerable saving may be effected by suitably modifying the transformers in such a manner as to cause three-phase fluxes to circulate in the magnetic circuits of the transformers rather than two-phase fluxes, as would be the ordinary practice. A transformer suitable for effecting this result is shown in Fig. 1, in which G represents a two-phase generator having field-coils F, suitably excited, and lines or mains 1 2 3 4 leading from the collector of the machine in the usual manner. At T is indicated a transformer-core having three legs or subdivisions. The two outside legs are provided with both primary and secondary windings, while the middle leg, which forms a common return for the other two, may or may not be provided with windings, as will be hereinafter explained. The primary windings are from necessity supplied with two-phase currents, and in order, therefore, to produce three-phase fluxes in the core it is necessary to impress upon the core three-phase magnetomotive forces, and this result I secure by making combinations of magnetomotive forces displaced in phase from each other by one-quarter of a period, but having such relative magnitudes as to produce resultant magnetomotive forces differing in phase by one-third of a period. The means by which this is accomplished will be better understood by reference to the diagram shown in Fig. 2. In this figure *a b* represent the phase relation of current flowing in the leads of the machine G, and, as shown, these currents are ninety degrees or one-quarter of a period apart. The desired phase relation of fluxes in the transformer-core is indicated by the lines $c\ d$, which are shown as displaced from each other by one-third of a period or one hundred and twenty degrees. In order to produce resultant magnetomotive forces corresponding in phase to the relation of $c$ and $d$, it is necessary to combine component magnetomotive forces ninety degrees apart. In the proportions indicated in the diagram this has been done by combining first the magnetomotive force $a$ and the magnetomotive force $e$, displaced therefrom ninety degrees, thereby producing the resultant $c$. In a similar manner $b$ and $f$ represent the relative values of two quarter-phase magnetomotive forces required to produce a resultant $d$. From inspection of the figure it will be noted that the sum of the angle between $a$ and $c$ and between $b$ and $d$ is equal to the difference between the phase-angles of the exciting-current and the fluxes to be produced thereby. So long as this relation is maintained the two angles may have any relative value provided their sum remains the same. For the sake of uniformity, however, I have chosen to make these angles equal to each other, in which case each will be an angle of fifteen degrees, and the magnetomotive forces which form the components of the resultant magnetomotive forces $c\ d$ will therefore be related to each other in the ratio of the sine and cosine of fifteen degrees. In order to cause this relation of magnetomotive forces in the transformer T, I provide each of the legs $L'\ L^2$ of the transformer with two primary windings, the number of turns of the two windings on each leg being related to each other in the ratio of the sine and cosine of fifteen degrees. This relation I have roughly indicated in the drawings by coils of different sizes. In order to correspond with the diagram in Fig. 2, the windings are indicated by the letters $e\ a\ b\ f$. The windings $e$ and $b$ must evidently carry current in the same phase, and are therefore connected in series with each other and with one of the mains of the transmission system—as, for instance, the main 1. In a similar manner windings $a$ and $f$ are connected in series with each other and with one of the mains of the transmission system—as, for instance, the main 3, carrying current differing ninety degrees from that flowing in the main 1, to which the other primary windings are connected. As thus arranged it will be evident that when a two-phase current flows in the primary exciting-coils three-phase fluxes are induced in the cores or legs $L'\ L^2$. As seen, these fluxes are provided with a common return-circuit formed by the leg $L^3$ of the transformer, and since two equal vectors displaced in phase by one hundred and twenty degrees form a resultant equal to either of its components the cross-section of the middle leg is equal to that of either of the other legs of the transformer. The employment of three-phases fluxes in this manner is distinctly advantageous over the use of two-phase fluxes, such as would ordinarily have been obtained by exciting one of the legs of the transformer from one phase only of the transmission system and the other leg from the other phase, and this advantage arises from the fact that the resultant of two equal fluxes, ninety degrees apart in phase, has a value equal to $\sqrt{2}$ times the value of either component. With two-phase fluxes it would therefore be necessary to make the cross-section of the common return $L^3$ equal approximately to 1.42 times the cross-section of either of the legs $L'\ L^2$. The iron loss is therefore largely reduced by the use of three-phase fluxes and a considerable amount of iron is saved.

Secondary coils are placed about two or more of the legs of the transformer, and in these coils three-phase electromotive forces are induced. By connecting two coils in series—as, for instance, the coils $s'\ s^2$—and bringing connections from their free terminals and their common connection three-phase currents may be obtained. Two sides of the three-phase triangle are thus formed by the electromotive forces acting on the system, while the third side remains open. If desired, however, the third electromotive force may be added, thereby producing a more symmetrical system. In this case a third coil $s^3$ (shown in Fig. 1) is placed on the common return or leg $L^3$ with its terminals connected to the outside terminals 5 6 of the secondaries $s'\ s^2$. All three phases will thus be equally loaded.

The mode of transformation thus described is susceptible of application to many purposes, and I intend, therefore, to lay claim to the same regardless of the particular use to which it may be put. In the particular application shown, however, the three-phase lines or conductors 5 6 7, leading from the secondary of the transformer T, are connected to collector-rings on the armature of the exciter E. These collector-rings are connected to points in the armature-winding in a manner corresponding to the connection of collector-rings in a three-phase generator or motor, and therefore require no special description. The exciter E is mounted on the same shaft with the generator G or is otherwise mechanically driven, so as to have a rate of rotation synchronous with the generator. The simplest construction is to make the number of poles of the generator and exciter equal and to run them at the same speed by direct connection; but it will be obvious that they may be run at different speeds, provided that the relation between the poles of the two machines be made to correspond.

To secure the necessary regulation of the exciter by means of the alternating current passed in its armature from the mains of the machine to be regulated, the angular relation of the armatures of the main machine and its exciter is made such that the polar line produced by the alternating current is at right angles to the field of the exciter when the current in the main machine is in phase with its induced or internal electromotive force. Owing to the self-induction possessed by a dynamo-electric machine, it may be here noted that when the current is in phase with the internal or induced electromotive force of the machine it lags with respect to the terminal voltage of the machine. Therefore when the machine to be regulated is working at unit-power factor the polar line of the exciter will be advanced slightly in position, thus producing a component of armature reaction which is arranged so as to increase the field of the exciter, and consequently increase the field of the main machine, thereby compensating for the effects of self-induction and armature reaction. Since the present invention is not coextensive with the broad principle of regulation above referred to, it is not necessary here to go into further detail. If, however, further information is desired, reference may be had to the patent to E. W. Rice, Jr., above mentioned.

Since the regulation of the exciter is to be secured by taking advantage of the effects of armature reaction, it is necessary in order to secure the best results to have a comparatively weak field for the exciter in order that it may more readily be acted upon by the reaction of the armature-current. At the same time the armature reaction should be made as strong as possible in order to secure the maximum effect from the comparatively weak magnetomotive forces derived from the alternating current. When the exciter is thus constructed with a weak field and strong armature reaction, it becomes unstable in operation and its electromotive force varies through wide limits with very slight variations in speed and changes in armature reaction. To overcome this unsteadiness of operation without destroying its characteristic mode of action, I construct the magnetic circuits of the field with an auxiliary partial air-gap at some point. In the instance shown each field-pole has a deep slit or cut K extending half-way across the pole and arranged to intercept the flux through the pole. At low magnetic densities practically all of the flux will flow through the iron neck, (indicated, for example, at N,) while at higher densities the neck will become saturated and lines of force will flow across the auxiliary air-gap K. This introduction of an auxiliary gap into the circuit at some selected flux density causes the saturation curve to bend, so that above the bend the field-flux is no longer proportional to the magnetomotive forces producing the same, but varies at a slower rate than the variation of such magnetomotive force. Any desired degree of stability may thus be secured.

What I claim as new, and desire to secure by Letters Patent of the United States, is—

1. A transformer having three legs of equal cross-section, two only of which are supplied with primary coils, and a secondary coil on each of said legs.

2. A transformer having three legs of equal cross-section, two of which are acted upon by magnetomotive forces due to currents differing in phase by ninety degrees, and a secondary coil located on each of said legs.

3. The combination of a dynamo-electric machine, an exciter therefor having a field of low magnetic density, an armature of high-armature reaction, and an auxiliary air-gap in its magnetic circuit for securing stability of operation, and means for passing through the armature of the exciter, alternating current derived from leads of said dynamo-electric machine.

4. The combination of a dynamo-electric machine, phase-changing apparatus connected to leads of said machine, an exciter, and means for passing current from said phase-changing device through the armature of the exciter.

5. The combination of a dynamo-electric machine, an exciter therefor, and means for supplying the armature of the exciter with current of a number of phases different from that flowing in leads of said machine.

6. The combination of a dynamo-electric machine, a phase-changing transformer connected to leads of said machine, an exciter, and means for passing secondary current from the transformer through the armature of the exciter.

7. A multiphase transformer having three legs, one of which forms a common return for the other two, two of the legs being provided with primary and secondary coils, while the third is provided with a single coil only.

In witness whereof I have hereunto set my hand this 29th day of March, 1902.

CHARLES P. STEINMETZ.

Witnesses:
BENJAMIN B. HULL,
HELEN ORFORD.